DYNAMIC STORE WITH SERIAL INPUT AND PARALLEL OUTPUT
Filed March 16, 1962
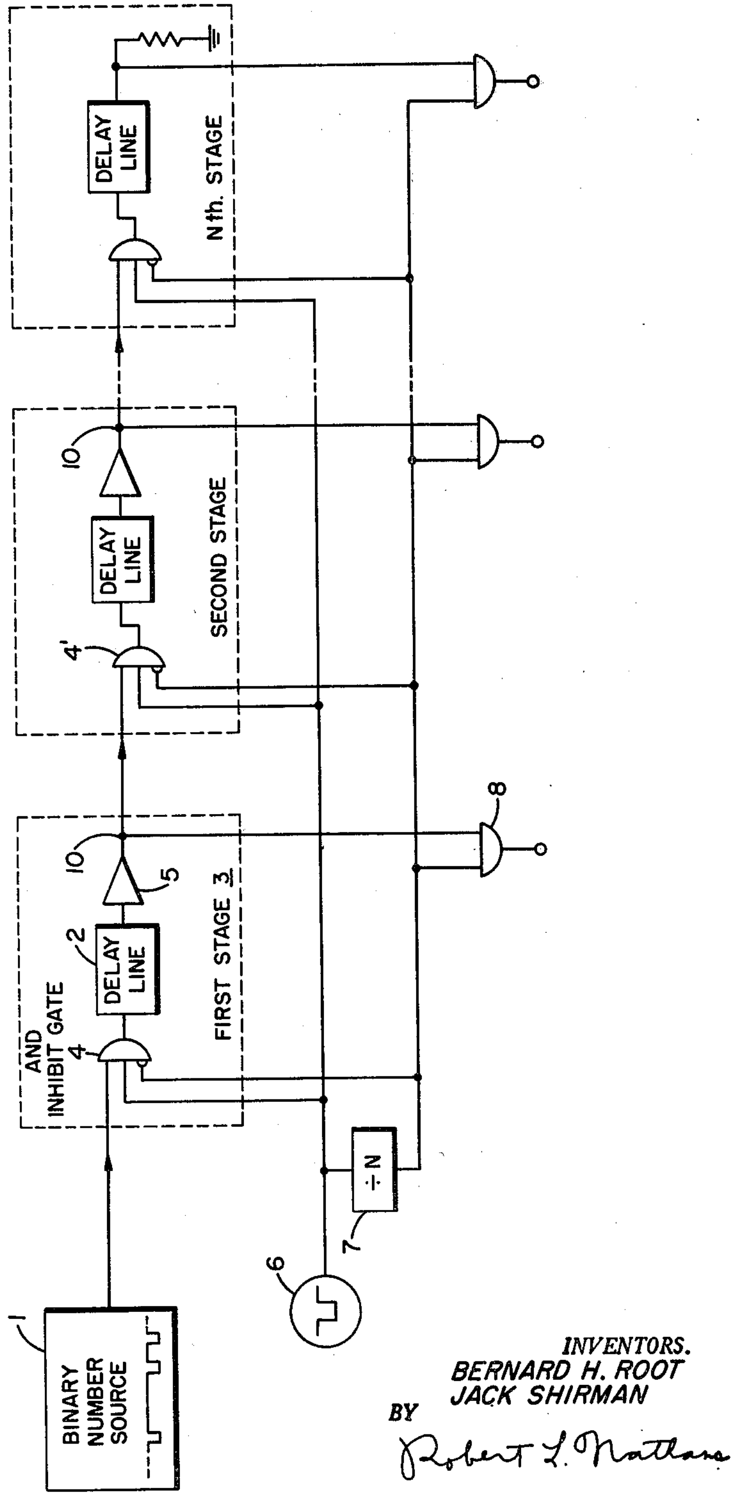
INVENTORS.
BERNARD H. ROOT
JACK SHIRMAN
BY
Robert L. Nathans
ATTORNEY United States Patent Office 3,151,314 Patented Sept. 29, 1964

3,151,314
DYNAMIC STORE WITH SERIAL INPUT AND PARALLEL OUTPUT

Bernard H. Root, Palmyra, and Jack Shirman, Penfield, N.Y., assignors to General Dynamics Corporation, Rochester, N.Y., a corporation of Delaware Filed Mar. 16, 1962, Ser. No. 180,109
4 Claims. (Cl. 340—173)

The present invention relates to dynamic binary storage devices.

One of the disadvantages of utilizing tandemly connected delay lines as dynamic storage elements relates to "ringing" or the undesirable reflections of a binary "one" back and forth within the composite store or within each delay line. These reflections may cause spurious binary "ones" to appear during a subsequent readout step where binary "zeros" should, in fact, be present. In addition, tandemly connected delay elements cause cumulative pulse stretching which could also result in the introduction of spurious binary "ones" in adjacent delay elements.

Accordingly, it is the principal object of the present invention to provide a new and improved dynamic binary store.

It is a further object of the present invention to provide a new and improved dynamic store which is free from the generation of spurious binary "ones" in the delay elements due to variations in the input impedance of each delay element or due to cumulative pulse stretching of pulses passing through the store.

It is yet a further object of the present invention to provide an improved store for accepting a binary number serially and automatically reading said number out in parallel fashion when the number completely fills the store.

Further objects and advantages of the invention will become apparent as the following description proceeds, and the features of novelty which characterize the invention will be pointed out with particularity in the claims annexed to and forming a part of this specification.

For a better understanding of the invention, reference may be had to the accompanying drawing which discloses a preferred embodiment of the present invention.

In accordance with the present invention, a binary number source is connected to the first of N storage stages connected in tandem. Each stage comprises a forwarding gate, a delay line, and an amplifier. A clock pulse having a precisely controlled pulse width enables each forwarding gate at the stepping frequency so as to prevent cumulative pulse stretching. When the binary number having N-digits completely fills the serial store, readout gates are enabled and the forwarding gates are simultaneously inhibited so as to prevent binary "ones" which are being read out from being forwarded to subsequent stages. This inhibiting of the forwarding gates while simultaneously enabling the readout gates also serves to maintain the input impedance of each stage constant so as to prevent "ringing."

Referring now to the drawing, a binary number source 1 is connected to delay line 2 of first storage device 3 through a first terminal of forwarding AND gate 4, as shown. A fifteeen megacycle clock pulse source 6 is coupled to a second input terminal of AND gate 4 and is coupled to the second input terminals of corresponding gates in each stage. The delay time of each stage is sixty-six and two-thirds nanoseconds so that, where the Nth stage is the fifteenth stage, a binary number having fifteen digits will be inserted into the dynamic store each microsecond. The input circuit of frequency divider 7 is coupled to the fifteen megacycle clock pulse source 6 and the output circuit of frequency divider 7 is coupled to the first input terminals of N-readout AND gates, as shown. Accordingly, the readout gates will be enabled each time the N-digit binary number is inserted into the dynamic store and, in the case where N equals fifteen, readout will occur at a rate of one million times a second (fifteen megacycles divided by N where N equals fifteen). Since the forwarding AND gates are enabled, or opened, only during the application of the well defined and relatively narrow clock pulses, it should be apparent that cumulative pulse stretching in the store is eliminated. The output circuit of frequency divider 7 is also coupled to the inhibit terminals of each forwarding AND gate, as shown. Consequently, when the readout AND gates are enabled to read the binary number out of the dynamic store, the forwarding AND gates are inhibited, or closed, so as to prevent binary "ones" from being forwarded to subsequent stages of the store, which could result in the presence of spurious "ones" when the store is subsequently read out. The details of the forwarding AND gates form no part of the present invention and, accordingly, the gates are shown schematically.

Since the characteristic impedance of each delay line is constant, the impedance of the source feeding the individual delay line should also remain constant to prevent ringing. In other words, the composite impedance of forwarding AND gate 4', and readout AND gate 8, should remain constant regardless of which gate is enabled. When the impedance of one gate decreases upon a change of state, the impedance of the other gate will be made to increase by a like amount to maintain the impedance at junction 10, or the pulse source impedance feeding each delay line, constant.

The amplifiers 5 are coupled to the output circuits of each delay line to provide amplification and isolation between stages, thereby to prevent pulses from traveling from right to left through the store.

While there has been disclosed what is at present considered to be the preferred embodiment of the invention, other modification will readily occur to those skilled in the art. It is not, therefore, desired that the invention be limited to the specific arrangement shown and described, and it is intended in the appended claims to cover all such modifications as fall within the true spirit and scope of the invention.

What is claimed is:

1. A binary data store comprising:

(*a*) a source of binary numbers, (*b*) a first delay device having an input circuit and an output circuit, (*c*) a second delay device having an input circuit and and an output circuit, (*d*) a forwarding AND gate having a first and second input terminal and an output terminal, (*e*) means for coupling said binary number source to the input circuit of said first delay device, (*f*) means for coupling the output circuit of said first delay device to the first input terminal of said forwarding AND gate, (*g*) means for coupling the output terminal of said forwarding AND gate to the input circuit of said second delay device, (*h*) a first and second readout AND gate each having a first and second input terminal and an output terminal, (*i*) means for coupling the first input terminal of said first readout AND gate to the output circuit of said first delay device, (*j*) means for coupling the first terminal of said second readout AND gate to the output circuit of said second delay device, (*k*) a clock pulse source for producing a pulse train having a certain frequency, (*l*) means for coupling said clock pulse source to the second input terminal of said forwarding AND gate, (*m*) means coupled to the second input terminal of said first and second readout AND gates for enabling said readout AND gates at a frequency less than the frequency of the pulse train produced by said clock pulse source, and (*n*) means for inhibiting the enabling of said forwarding AND gate upon the enabling of said readout AND gate.

2. The combination as set forth in claim 1 wherein the composite impedance of said forwarding AND gate and its associated readout AND gate remains constant regardless of which gate is enabled.

3. A binary data store comprising:

(*a*) a source of binary numbers, each of said numbers having N digits, N being an integer, (*b*) a first delay device having an input circuit and an output circuit, (*c*) an Nth delay device having an input circuit and an output circuit, (*d*) a first and Nth forwarding AND gate each having a first and second input terminal and an output terminal, (*e*) means for coupling said binary number source to the first input terminal of said first forwarding AND gate, (*f*) means for connecting the output terminal of said first forwarding AND gate to the input circuit of said first delay device, (*g*) means for coupling the output circuit of said first delay device to the first input terminal of said Nth forwarding AND gate, (*h*) means for coupling the output circuit of said Nth forwarding AND gate to the input circuit of said Nth delay device, (*i*) a first and Nth readout AND gate each having a first and second input terminal and an output terminal, (*j*) means for coupling the first input terminal of said first readout AND gate to the output circuit of said first delay device, (*k*) means for connecting the first terminal of said Nth readout AND gate to the output circuit of said Nth storage device, (*l*) a clock pulse source for producing a pulse train having a frequency of M-cycles a second, M being an integer, (*m*) means for coupling said clock pulse source to the second input terminal of said first and Nth forwarding AND gates, (*n*) means coupled to the second input terminal of said first and Nth readout AND gates for enabling said readout AND gates $$\frac{M}{N}$$

times a second, and (*o*) means for inhibiting the opening of said forwarding AND gates upon the enabling of said readout AND gates.

4. The combination as set forth in claim 3 wherein the composite impedance of said forwarding AND gate and said first readout AND gates remain constant regardless of which gate is enabled.

References Cited in the file of this patent

UNITED STATES PATENTS

| | | |
|---|---|---|
| 2,854,657 | Straube | Sept. 30, 1958 |
| 3,002,108 | Sterzer | Sept. 26, 1961 |
| 3,056,112 | Lecher | Sept. 25, 1962 |